United States Patent [19]
Reid et al.

[11] Patent Number: 5,202,366
[45] Date of Patent: Apr. 13, 1993

[54] CROSSLINKABLE POLYESTER COMPOSITIONS WITH IMPROVED PROPERTIES

[75] Inventors: Carroll G. Reid, Charleston; Gary C. Rex, Cross Lanes, both of W. Va.

[73] Assignee: Union Carbide Chemicals & Plastics Technology Corporation, Danbury, Conn.

[21] Appl. No.: 750,714

[22] Filed: Aug. 20, 1991

Related U.S. Application Data

[63] Continuation of Ser. No. 332,587, Apr. 3, 1989, abandoned, which is a continuation-in-part of Ser. No. 221,651, Jul. 20, 1988, abandoned.

[51] Int. Cl.$^5$ .............................. C08L 67/06
[52] U.S. Cl. ..................... 523/516; 523/514; 523/527; 264/552; 525/28; 525/31; 525/44; 525/48; 525/111; 525/126; 525/170
[58] Field of Search ............... 525/44, 48, 170, 31, 525/111, 28, 126; 523/527, 514, 516; 264/552

[56] References Cited

U.S. PATENT DOCUMENTS

| | | | |
|---|---|---|---|
| 3,222,421 | 12/1965 | Lundberg | 525/44 |
| 3,549,586 | 12/1970 | Smith et al. | 260/40 |
| 3,621,093 | 11/1971 | Svoboda et al. | 264/331 |
| 3,668,178 | 6/1972 | Comstock et al. | 260/40 |
| 3,718,714 | 2/1973 | Comstock et al. | 260/862 |
| 3,736,278 | 5/1973 | Wada et al. | 260/22 |
| 3,883,612 | 5/1975 | Pratt et al. | 260/862 |
| 3,887,515 | 6/1975 | Pennington et al. | 260/40 |
| 3,909,483 | 9/1975 | Hindersinn et al. | 260/40 |
| 3,929,868 | 12/1975 | Dombroski et al. | 260/475 |
| 3,933,757 | 1/1976 | Pratt et al. | 260/75 |
| 3,994,853 | 11/1976 | Hindersinn et al. | 260/40 |
| 4,020,036 | 4/1977 | South, Jr. | 260/40 |
| 4,035,439 | 7/1977 | Stevenson | 260/859 |
| 4,101,604 | 7/1978 | Rowe | 260/862 |
| 4,160,759 | 7/1979 | Gardner et al. | 260/40 |
| 4,161,471 | 7/1979 | Kassal | 260/40 |
| 4,250,538 | 2/1981 | Durbin et al. | 362/97 |
| 4,260,538 | 4/1981 | Iseler et al. | 260/40 |
| 4,374,215 | 2/1983 | Atkins | 523/514 |
| 4,421,894 | 12/1983 | O'Connor et al. | 525/28 |
| 4,525,498 | 6/1985 | Atkins et al. | 523/511 |
| 4,535,110 | 8/1985 | Iseler et al. | 524/196 |
| 4,673,706 | 6/1987 | Atkins | 525/31 |
| 4,755,557 | 7/1988 | Atkins et al. | 525/27 |

FOREIGN PATENT DOCUMENTS

| | | |
|---|---|---|
| 849135 | 7/1977 | Belgium . |
| 0028841 | 5/1981 | European Pat. Off. . |
| 0031434 | 7/1981 | European Pat. Off. . |
| 0058740 | 9/1982 | European Pat. Off. . |
| 74746 | 3/1983 | European Pat. Off. . |
| 0234692 | 2/1987 | European Pat. Off. . |
| 1361841 | 7/1974 | United Kingdom . |

OTHER PUBLICATIONS

R. M. Griffith & H. Shanoski, "Reducing Blistering In SMC Molding", Plastics Design and Processing, pp. 10-12 (Feb. 1977).

Primary Examiner—Patricia A. Short
Attorney, Agent, or Firm—W. F. Gray

[57] ABSTRACT

A process is disclosed for producing molded parts from a polyester-based curable molding composition which includes a thermostetting unsaturated polyester resin, an ethylenically unsaturated monomer which is copolymerizable with the unsaturated polyester resin to provide crosslinking, a thermoplastic low profile additive material for shrinkage control and in addition, at least one highly reactive olefinically unsaturated crosslinkable monomer, this highly reactive olefinically unsaturated material being selected from the group consisting of:

a) the di-acrylate or methacrylate of a diol selected from the group consisting of hexane diols, neopentyl glycol, butylene glycol, diethylene glycol, tetraethylene glycol, and tripropylene glycol;
b) the tri-acrylate or methacrylate of trimethylol propane;
c) the tetra-acrylate or methacrylate of pentaerythritol;
d) the di-acrylate or methacrylate of an ethoxylated Bis Phenol A;
e) the acrylate or methacrylate of isobornyl alcohol; and
f) divinyl benzene.

8 Claims, No Drawings

CROSSLINKABLE POLYESTER COMPOSITIONS WITH IMPROVED PROPERTIES

RELATED APPLICATION

This application is a continuation of U.S. application Ser. No. 07/332,587. Filed Apr. 3, 1989, now abandoned, which is a continuation-in-part of application Ser. No. 07/221,651. Filed Jul. 20, 1988, which is now abandoned.

BRIEF DESCRIPTION OF THE INVENTION

Fiber reinforced polyester molding compositions utilizing poly-acrylic compounds to provide enhanced surface appearance, resistance to cracking and improved interlaminar shear strength.

BACKGROUND OF THE INVENTION

FIELD OF THE INVENTION

Unsaturated polyester resins are widely employed commercially in a variety of reinforced fabrication systems including among others matched metal-die compression, transfer, pultrusion and injection molding. These systems involve curing a formulated compound at high temperatures and pressures in hardened and chrome plated molds. These methods provide the highest volume and highest part uniformity of any thermoset molding technique.

For the purposes of the descriptions dealt with herein, these resins are characterized in terms of systems containing them, and the systems encompass the following types:

1. Resin systems free of reinforcement. This is a resin system utilizes a thermosettable resin that is designed to be used as such or with reinforcement at the high temperatures and pressures utilized in a variety of reinforced fabrication systems including among others matched metal-die compression, transfer, pultrusion and injection molding. When the term "resin system" is used herein, such contemplates a composition using a thermosettable resin that is free of reinforcement, fibrous or non-fibrous, unless it is specifically indicated to contain reinforcement as contemplated in the definitions which follow.

2. "Reinforced resin system" is a resin system in which there is provided a sufficient amount of one or more of fibrous or non-fibrous materials as reinforcing agents that make a positive contribution to the physical properties of the molded product derived from the reinforced resin system.

3. "Non-fiber reinforced resin" system is a resin system in which there is provided a sufficient amount of one or more non-fibrous materials as reinforcing agents that make a positive contribution to the physical properties of the molded product derived from the non-fiber reinforced resin system. A non-fiber reinforced resin system is free of reinforcing amounts of a fiber.

4. "Fiber reinforced resin system" is a resin system in which there is provided a sufficient amount of one or more fibers as reinforcing agents that make a positive contribution to the physical properties of the molded product derived from the fiber reinforced resin system. A fiber reinforced resin system contemplates the optional presence of non-fiber reinforcing agent(s).

In order to minimize confusion in the descriptions which follow, the following terms as used in this specification and in the claims hereof, have the definitions set out for them:

The term "highly reactive olefinically unsaturated compound" means a olefinically polymerizable compound capable of providing crosslinking in the curing of a resin system containing the same, and having the following formula:

wherein R is a functional olefinically unsaturated group which provides a reactivity rate ($r_1$) [as defined in U.S. Pat. No.4,374,215] for the compound that is equal to or less than styrene, A is a moiety having the structure

wherein X is an organic group covalently bonded to R and R', R' is a functional olefinically unsaturated group which provides a reactivity rate ($r_1$) [as defined in U.S. Pat. No. 4,374,215] for the compound that is equal to or less than styrene, and n is 0, 1, 2 or 3, provided that when X has less than 6 carbon atoms, n is 1, 2 or 3, and when X has at least 6 carbon atoms, n may be 0, 1, 2 or 3, and when n is 0, R provides a reactivity rate less than that styrene.

The term "acrylyl crosslinkable monomer" means a highly reactive olefinically unsaturated compound that contains at least two acryl or methacryl groups per molecule or one acryl or methacryl group attached to a moiety containing at least 6 carbon atoms.

The term "base resin system" means a resin system containing as essential components
an unsaturated polyester resin, and
an ethylenically unsaturated monomer that is a solvent for the unsaturated polyester resin.

"low profile additive resin system" or "LPA resin system" means a resin system containing as essential components
a base resin system, and
a thermoplastic low profile additive.

"resin system of the invention" means a low profile additive resin system to which has been added a highly reactive olefinically unsaturated compound.

BACKGROUND TO THE FIELD OF THE INVENTION

Thermosetting resins are widely known to shrink on curing and this attribute introduces many property deficiencies in the resultant molded product. LPA resin systems have made a significant contribution to commercial thermosetting molding resin systems of all varieties. The low profile additives function to reduce shrinkage inherent in a resin system during the curing reaction and to thereby improve dimensional stability and surface smoothness. Low profile additives are, in general, thermoplastic polymers such as vinyl acetate polymers, acrylic polymers, polyurethane polymers, polystyrene, butadiene styrene copolymers, saturated polyesters and polycaprolactones.

A major advance in commercial thermosetting molding technology was the introduction of chemically thickened systems utilizing low profile additives. Chemical thickening is always employed in sheet molding compounds ("SMC"), and is increasingly being used in bulk molding compounds ("BMC"). In such systems, an alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tack free and easy to handle, and the high viscosity carries the glass fiber reinforcement to the extremities of the mold during crosslinking of the system. Thus, the combination of thickened systems in low profile additive resin systems has made a major contribution to the commercial expansion of polyester molding.

While low profile unsaturated polyester fiber glass reinforced molding systems (the combination of fiber reinforced resin system and LPA resin system) have gained wide acceptance in the transportation industry because of good surface appearance, dimensional stability, physical properties, production and assembly costs and weight savings (versus the use of metal), there remains a need for further improvements.

Some answers to these increased demands have previously been addressed by improvements in resin systems; for example:

1. U.S. Pat. No. 4,525,498, issued Jun. 25, 1985, to Kenneth E. Atkins et al, describes an improved low profile additive composition suitable for use in molding application which contains a thermosetting unsaturated polyester, a thermoplastic polymer additive to control shrinkage and an ethylenically unsaturated monomer, by the addition of an epoxy compound that is essentially free of reactive unsaturation.
2. U.S. Pat. No. 4,374,215 issued Feb. 15, 1983, to Kenneth E. Atkins, describes a polyester molding composition which is unique in the combination of a polyester resin, a copolymerizable olefinically unsaturated monomer, a thermoplastic polymer low profile additive to control shrinkage, and an effective amount of a second crosslinkable vinyl monomer having a reactivity ratio ($r_1$) with styrene of greater than 1.
3. U.S. Pat. No. 4,673,706 issued Jun. 16, 1987, to Kenneth E. Atkins, describes the addition of crosslinkable vinyl monomers and epoxy compounds to low shrinking polyester molding compositions containing unsaturated polyesters results in moldings with improved surface characteristics.
4. U.S. Pat. No. 4,755,557, issued Jul. 5, 1988, to Kenneth E. Atkins et al, describes a molding composition containing an unsaturated polyester resin, a copolymerizable ethylenically unsaturated monomer, a thermoplastic low profile additive and a lactone monomer.
5. U.S. Pat. No. 4,535,110 uses an isocyanate terminated urethane prepolymer composition in combination with thermoplastic low profile additives to yield improved shrinkage control of polyester molding compositions.

These classes of resin systems in molding materials have found acceptance by the transportation industry because of the good surface appearances, dimensional stabilities, physical properties, assembly consolidation and potential weight savings that they contribute. However, as applications for resin systems have grown, more demanding standards are being developed and imposed by the users of them.

As standards rise, subtle issues previously not addressed in a critical manner are being recognized. For example, there has developed a recognition that low profile additives tend to reduce the physical properties of the molded laminate. This is particularly pronounced at the elevated temperatures at which the parts are formed (viz., 130°-170° C.) under pressure. This reduction in properties is seen to be the cause for defects such as cracking, delamination (blistering) and others.

Blistering is the most severe defect since it almost always results in scrapping of the part. Considerable attention has been given to this defect in the past. An excellent publication discussing causes of and methods to reduce blistering is by R. M. Griffith and H. Shanoski, "Reducing Blistering In SMC Molding," *Plastics Design and Processing*, pp. 10-12 (February 1977).

The most likely mechanism for blister formation stems from pressurization of gas within the part during molding, followed by crack initiation and extension of the cracks when the press opens. The pressure results from expansion of air or other volatiles trapped or dissolved in the part. The gas pressure causes the delaminated area to deform into a blister. This deformation is usually permanent although reduced in sized, even when the pressure is relieved.

Trapping of gas during molding is a probable consequence of a practical molding operation. In addition, molded parts may again become pressurized internally when later heated either during painting or bonding operations. Therefore, an adequate level of interlaminar strength is required in the finished moldings to prevent blister formation.

In addition to the chemically thickened molding compositions mentioned above there is still a major and ever growing interest in compositions that are not chemically thickened. These are widely used and are of particular interest in the high speed process of injection molding. Because of its inherent faster cycles and ease of automation as compared to compression molding, injection molding of fiber reinforced resin systems is undergoing great growth for the production of automotive body panels. Frequently, unthickened compounds are desired in this application because they allow better control of the compound's viscosity and provide longer shelf life of the material without requiring machine and molding parameter changes. However, with this type of material there remains the need to obtain better surface smoothness and shrinkage control as contrasted with the systems used in compression molding.

A problem with these injection molded compositions is that they tend to crack in areas of reinforcing ribs and bosses in the molded part. These cracks can reduce the overall strength/integrity of the molded part (such as a head lamp reflector or door) and also serve as a source of gas release that causes paint film disruption ("popping") during finishing of the part. Reduction or elimination of this defect would lead to greater utility of injection moldable compositions and expand the design latitude for parts produced from them.

Diacrylates have been incorporated in unsaturated polyester formulations to improve the formulation's cure speed, see e.g., U.S. Pat. Nos. 3,621,093 and 4,260,538. The formulations of U.S. Pat. No. 3,621,093 do not contain low profile additives, and the compositions of this patent produce parts having a surface smoothness that is inadequate for the production of high quality automotive or truck body panels.

U.S. Pat. No. 4,260,538 describes the use of 0.01 to 0.02 parts by weight of polyacrylate. This amount is inadequate to achieve the levels of crack resistance and blister control desired by industry. In addition, the preferred formulation shown in Example I of this patent has been evaluated and has been found inadequate in surface smoothness for the most advanced body panel requirements.

European patent application 0 234 692, published Feb. 9, 1987, is primarily directed to cold cure processes in which the level of unreacted styrene or other volatile monomer used in unsaturated polyesters is sufficient in the cured resin "to cause the product to be too soft at demould, to smell, to undergo post-demould shrinkage and require a post-cure at some elevated temperature for example 80° C. for 3 hours." This problem is attacked by the addition of very large amounts (the examples characterize a range of from 15-40 weight percent) of a compound containing at least two groups of the formula

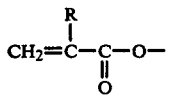

The specification of the application suggests using from 5-95 weight % of such compounds in the resin. The examples suggest that large amounts of the compound, alone or in combination with methyl methacrylate, in the range of 30 weight % of the "polymerizable resin composition," is needed to reduce the volatile styrene content in the polymerized product to a desirable level. These concentrations, in independent studies, have been found to adversely affect the surface properties of compression molded unsaturated polyester resin systems even in the presence of commercial low profile additives.

European patent application 0 234 692 also suggests that the polymerization composition may also include a low profile additive and in addition, the composition need not be limited to cold cure processes, but may be utilized in compression molding as dough molding or sheet molding compounds, in which the molding temperature is typically less than 140° C. and preferably is between 100° C. and 130° C. and "demoulding may be effected in less than 3 minutes and often effected in less than 1 minute." It is also suggested that the polymerizable resin composition can be used in pultrusion processes where the process temperatures are "typically carried out at less than 200° C.". It should be noted that these systems are not recognized by industry to suffer from levels of unreacted styrene, or other volatile monomer, in unsaturated polyesters that would be sufficient in the cured resin "to cause the product to be too soft at demould, to smell, to undergo post-demould shrinkage and require a post-cure at some elevated temperature for example 80° C. for 3 hours." Of course, these systems are cured, as the application notes, at temperatures greater than 100° C. Thus the application is contemplating an use for the composition other than one in which traditional softening from the presence of unreacted volatiles is a problem.

As a result of using such large amounts of the polyacrylic compound in the the "cold cure" composition, though the styrene monomer issue is minimized, the properties of the resultant "cold cure" polymer takes on the attributes of the poly-acrylic compound and not that of the unsaturated polyester. The ultimate virtues of such a system is not considered practical since such would necessitate a wholly new specification not akin to that of the unsaturated polyesters to which industry is accustomed. Though any new additive to a molding composition necessitates a modification of the industry specification then applicable prior to the modification, a minor additive would not require major revisions of the specification as would the utilization of a major modifier, as would be the case with the addition of greater than 20 weight % of a poly-acrylic to an a standard unsaturated polyester formulation.

There exists a demand for a superior resin system which provides under conventional high temperature molding conditions, such as practiced at temperatures of from about 140° to about 200° C., molded parts possessing exceptional surface smoothness with increased physical properties, particularly interlaminar tensile shear strength at elevated temperature.

In addition, there exists a demand for a superior resin system which provides under conventional high temperature molding conditions, such as practiced at temperatures of from about 140° to about 200° C., molded parts possessing minimum cracking at the surface and in the interior of the parts, resulting in greater serviceability of the part.

It is the contemplation of this invention to meet those demands and others by the use of a novel molding composition that utilizes known materials in an uniquely beneficial manner not heretofore contemplated.

THE INVENTION

In accordance with the present invention, there is provided a means for making low shrink, curable, fiber reinforced molding compositions that can be used to generate molded parts at high temperature molding conditions which possess exceptional surface smoothness with increased physical properties, particularly interlaminar tensile shear strength at elevated temperature, and also exhibit a greater resistance to cracking from the molding operation. This is accomplished by the addition of a small but meaningful amount of a highly reactive olefinically unsaturated compound to a resin system.

The invention embraces, in particular, a curable composition comprising:
i. a thermosetting unsaturated polyester resin,
ii. an olefinically unsaturated monomer that is co-polymerizable with the polyester resin,
iii. a low profile additive for shrinkage control, and
iv. one or more highly reactive olefinically unsaturated compounds in which highly reactive olefinically unsaturated compound(s) is present in the composition in an amount sufficient to improve the cracking resistance of the curable composition without adversely affecting the surface smoothness of the cured composition thereof.

In a preferred aspect, the invention embraces a curable composition comprising:
i. a thermosetting unsaturated polyester resin,
ii. an olefinically unsaturated monomer that is co-polymerizable with the polyester resin,
iii. a low profile additive for shrinkage control, and
iv. an acrylyl crosslinkable monomer present in the composition in an amount sufficient to improve the cracking resistance of the curable composition without adversely affecting the surface smoothness of the cured composition thereof.

The term "without adversely affecting the surface smoothness of the cured composition" does not mean that the surface is unaffected or improved; it simply means that the surface smoothness is suitable for commercial applications, even though there has been a downgrading of the surface smoothness.

This invention also contemplates a composition comprising, based upon the weight of the composition:
i. about 25 to about 70 weight percent of a thermosetting unsaturated polyester resin,
ii. 25 to 70 weight percent of an olefinically unsaturated monomer that is copolymerizable with the polyester resin,
iii. about 5 to about 25 weight percent of a low profile additive, and
iv. about 1 to about 10 weight percent of a highly reactive olefinically unsaturated compound.

This invention also contemplates a composition comprising, based upon the weight of the composition:
i. about 25 to about 70 weight percent of a thermosetting unsaturated polyester resin,
ii. 25 to 70 weight percent of an olefinically unsaturated monomer that is copolymerizable with the polyester resin,
iii. about 5 to about 25 weight percent of a low profile additive, and
iv. about 1 to about 10 weight percent of a an acrylyl crosslinkable monomer.

This invention also contemplates a composition comprising, based upon the weight of the composition:
i. about 10 to about 70 weight percent of a thermosetting unsaturated polyester resin,
ii. about 5 to about 70 weight percent of an olefinically unsaturated monomer that is copolymerizable with the polyester resin,
iii. about 2.5 to about 25 weight percent of a low profile additive,
iv. about 5 to about 60 weight percent of fiber reinforcement, and
v. about 0.5 to about 10 weight percent of a highly reactive olefinically unsaturated compound.

In addition, this invention provides polyester molding compositions in which:
a. a LPA resin system in which the polyester resin comprises the reaction product of an olefinically unsaturated dicarboxylic acid or anhydride with a polyol, in which no more than about 30 molar percent of the unsaturated acid or anhydride can be replaced with a non-crosslinkable acid;
b. one or more of an epoxy monomer essentially free of reactive unsaturation and a secondary crosslinking monomer with an $r_1$ value greater than 1 relative to styrene; and
c. a highly reactive olefinically unsaturated compound which is present in amounts of 1–20 parts based on a total of 100 parts of the LPA resin system plus component b. above.

A further embodiment of this invention comprises:
i. a LPA resin system;
ii. one or more highly reactive olefinically unsaturated compounds in which highly reactive olefinically unsaturated compound(s) is present in the composition in an amount sufficient to improve the cracking resistance of the curable composition without adversely affecting the surface smoothness of the cured composition thereof;
iii. the optional presence of one or more of an epoxy monomer essentially free of reactive unsaturation and a secondary crosslinking monomer with an $r_1$ value greater than 1 relative to styrene; and
iv. an isocyanate terminated prepolymer material based either on polyether or polyester polyols.

DETAILED DESCRIPTION

The invention is concerned with an improvement in thermosetting resin molding compositions and additive compositions which may be employed in making effective thermosetting resin molding compositions. The invention contemplates molding compositions suitable for compression, casting, transfer, injection, pultrusion, vacuum forming, and the like, molding techniques. The invention is directed to thermoset molding systems possessing enhanced flow characteristics and surface control. The invention provides unique compositions and methods for making molding compositions and molded products that provide low shrink, curable, fiber reinforced molding compositions that can be used to generate molded parts at high temperature molding conditions which possess exceptional surface smoothness with increased physical properties, particularly interlaminar tensile shear strength at elevated temperature, and also exhibit a greater resistance to cracking from the molding operation.

The invention contemplates the use of resin systems that allows the combination of low profile additives with a variety of thermosetting resins, that is, resins that cure by crosslinking through functional groups in the polymeric resin. The greatest proportion of the resin systems employ unsaturated polyester resins. Other resins include, e.g., phenolic resins, epoxy resins, urethane resins, and the like.

Thermosetting Resins

Thermosetting polyester resins preferably used in the practice of the invention are polyester resins that are reaction products of a dicarboxylic acid or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups. Such acids include maleic acid or anhydride, fumaric acid, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions should contain residual acidity in order to enter into the thickening reaction. The nature and production of the polyesters used in such applications, such as dicyclopentadiene modified resins, are known in the art and are described in U.S. Pat. Nos. 3,933,757 and 3,883,612 incorporated herein by reference.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal, polymerizable unsaturated groups are disclosed in U.S. Pat. No. 3,887,515, to Pennington, et al., along with the preparation of such resins.

Crosslinkable Monomers

The resin systems of the invention employ low viscosity crosslinking monomers. Where the resin is an unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as α-methyl styrene, α-chlorostyrene, 4-methylstyrene, and the like, divinylbenzene, acrylonitrile, methacrylonitrile, and the like. Styrene is the preferred monomer in commercial practice today, although others can be used.

The low viscosity crosslinking monomer is also employed in the resin composition (the thermosetting resin may be a solid at ambient temperatures, i.e., about 20°-25° C.) to dissolve the resin thereby ensuring that the resin composition is a fluid. In this case, the monomer acts as a reactive diluent. Enough monomer is employed so that the viscosity of the fluid is at a convenient level for processing. Excessive amounts of the monomer should be avoided because an excess can have an adverse effect on the cured resin's properties. For example, too much monomer tends to cause embrittlement of the cured polyester. With these guidelines, effective proportions of the monomer are normally found within the range of from about 25 to about 70, and preferably 40 to 55, weight percent, based on weight of thermosetting polyester resin plus monomer and thermoplastic additive.

Low Profile Additive

An essential component of the compositions of the invention are thermoplastic low profile additives. In one preferred aspect, the low profile additives that may be employed in the invention are thermoplastic polymers of vinyl acetate, saturated thermoplastic polyesters, mixtures of the same. In another aspect of the invention, the low profile additive that may be employed are thermoplastic polyalkyl methacrylate polymers. In still other aspects of the invention, other thermoplastic low profile additives, such as polyurethanes, styrene- butadiene and similarly used materials, are contemplated.

Suitable thermoplastic vinyl acetate polymer low profile additives are poly(vinyl acetates) homopolymers and thermoplastic copolymers containing at least 50 weight percent vinyl acetate. Such polymers include, for example, vinyl acetate homopolymer, carboxylated vinyl acetate polymers including copolymers of vinyl acetate and ethylencially unsaturated carboxylic acids, such as acrylic acid, methacrylic acid, crotonic acid, maleic acid, fumaric acid, itaconic acid, and the like, or anhydrides such as maleic anhydride, vinyl acetate/vinyl chloride/maleic acid terpolymers, and the like. Reference is made to U.S. Pat. No. 3,718,714 to Comstock, et al, and British Pat. No. 1,361,841 to Comstock, et al. for descriptions of some of the suitable vinyl acetate polymer low profile additives.

The useful vinyl acetate polymer low profile additives ordinarily have molecular weights within the range of from about 10,000 to about 250,000 and preferably from about 25,000 to about 175,000. They are usually employed in proportions of from about 5 to 25, and preferable from about 9 to 16, weight percent, based on weight of polyester plus thermoplastic, plus monomer.

Suitable thermoplastic saturated polyester low profile additives are, in general, low molecular weight saturated polymerize of polymerizable linear and/or cyclic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of about 0.2 to about 10.

Suitable polymers are further characterized by the following basic recurring structural Unit I

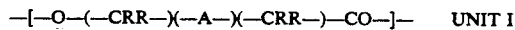
—[—O—(—CRR—)—A—)(—CRR—)—CO—]—  UNIT I wherein each R, which can be the same or different, is hydrogen, halogen, i.e. chlorine, bromine, iodine, or fluorine, or a monovalent hydrocarbon radical generally containing a maximum of 12 carbon atoms, and preferably containing a maximum of eight carbon atoms. A is an oxy (—O—) group; x is an integer having a value of 1 to 4 inclusive, y is an integer having a value of 1 to 4 inclusive, z is an integer having a value of 0 or 1, with the proviso that (a) the sum of x+y+z is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl t-butyl, n-hexyl, 2-ethylhexyl, n-dodecyl, chloroethyl, chloropropyl and the like; alkoxy radicals such as t-methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl, and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

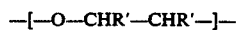
—[—O—CHR'—CHR'—]—  UNIT II wherein each R', is defined for R of Unit I, or in which the two R' variables together with the ethylene moiety of the oxyethylene chain of Unit II from a saturated cycloaliphatic hydrocarbon ring having from four to eight carbon atoms inclusive. It is referred that recurring Unit II contains from two to twelve carbon atoms inclusive. The interconnection of Unit I and the Unit II does not involve or result in the direct bonding of two oxy groups i.e., —O—O—.

Particularly preferred polymers of cyclic esters are those which are characterized by the oxypentamethylenecarbonyl chain as seen in basic recurring structural Unit III

UNIT III wherein each $R_1$ is hydrogen or lower alkyl, that is, alkyl having a maximum of 4 carbon atoms, with the proviso that no more than three $R_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

Also included are thermoplastic, saturated polyesters based on saturated (i.e., free of olefinic unsaturation that is reactive with the resin in the molding application) dicarboxylic acids, such as adipic acid, isophthalic acid, terephthalic acid, and the like, and organic diols, such as ethylene glycol, diethylene glycol, neopentyl glycol, 1,6-hexanediol, and the like. These polyesters are described in, for example, U.S. Pat. Nos. 3,909,483; 3,994,853; 3,736,278; and 3,929,868.

Thermoplastic urethanes are useful low profile additives, alone or in admixture with other low pressure additives, and examples of them can be found in U.S. Pat. No. 4,035,439, patented Oct. 17, 1975, EP 74 746, published Sep. 3, 1981, and U.S. Pat. No. 4,421,894, patented Mar. 2, 1979.

The thermoplastic saturated polyester low profile additives may usually be employed in the compositions of the invention in proportions similar to those of thermoplastic vinyl acetate polymers, i.e., in proportions from about 5 to 25 weight percent, and preferably from about 10 to 20 weight percent, based on the weight of polyester, thermoplastic polymer and crosslinkable monomer.

Also suitable in certain aspects of the invention are thermoplastic polymeric alkyl acrylates or methacrylates low profile additives including, for example, homopolymers of methyl methacrylate, ethyl methacrylate, butyl methacrylate, methyl acrylate, ethyl acrylate; copolymer of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, and methacrylic acid. Other useful thermoplastics for the low profile additive function include polystyrene, styrene copolymers, such as styrene/butadiene copolymers, cellulose acetate butyrate, alkylene oxide polymers, and the like.

Molecular weight of the alkyl acrylate or methacrylate polymers useful in the invention may vary over a wide range from 10,000 to 1,000,000, and preferably from 25,000 to 500,000.

The thermoplastic acrylate or methacrylate polymers should be present in amounts ranging from 1 to 25 percent by weight, based on the weight of polyester, low profile additive and crosslinking monomer, and preferably from 5 to 20 percent by weight.

Highly Reactive Olefinically Unsaturated Compounds

The highly reactive olefinically unsaturated compounds are compounds that are different from the aforementioned crosslinkable monomer that is provided in any of the formulations of the invention though the class of highly reactive olefinically unsaturated compounds includes many compounds that may be used as crosslinkable monomers. In other words, the highly reactive olefinically unsaturated compounds used in any of the actual formulations of the invention would in each instance be different from the compound that is used in the formulation to function as the crosslinkable monomer(s). In most cases, the desired crosslinkable monomer is styrene, that is, monostyrene. Consequently, the choice of highly reactive olefinically unsaturated compounds is not subject to any limitations of choice since by definition, these compounds do not encompass styrene.

Another aspect of the function of the highly reactive olefinically unsaturated compounds is reflected in the amount of the compounds that are employed in a resin system. In the typical embodiment of the invention, the highly reactive olefinically unsaturated compounds are present in resin systems in amounts less than the amount of crosslinkable monomer present in the resin system. In the typical resin system according to the invention, the amount of the highly reactive olefinically unsaturated compounds present in the resin system is less than about 10 weight percent of the weight of the resin system, preferably from about 1 to about 10 weight percent, same basis. This means that the contribution of the highly reactive olefinically unsaturated compounds is different from that of the crosslinkable monomers for a number of now apparent reasons, to wit:

1. A distinct property improvement to the resin system and cured molded parts made therefrom is evident;
2. A minor component in terms of concentration, such as the highly reactive olefinically unsaturated compounds, that makes a contribution to properties would by such fact be different in its performance from that of the major component(s), such as the crosslinkable monomers, such as styrene.

The highly reactive olefinically unsaturated compounds are olefinically polymerizable compounds capable of providing crosslinking in the curing of a resin system containing the same, and having the following formula:

R—A wherein R is a functional olefinically unsaturated group which provides a reactivity rate ($r_1$) [as defined in U.S. Pat. 4,374,215] for the compound that is equal to or less than styrene, A is a moiety having the structure X(R')$_n$ wherein X is an organic group covalently bonded to R and R', R' is a functional olefinically unsaturated group which provides a reactivity rate ($r_1$) [as defined in U.S. Pat. No. 4,374,215] for the compound that is equal to or less than styrene, and n is 0, 1, 2 or 3, provided that when X has less than 6 carbon atoms, n is 1, 2 or 3, and when X has at least 6 carbon atoms, n may be 0, 1, 2 or 3, and when n is 0, R provides a reactivity rate less than that styrene.

Encompassed by the highly reactive olefinically unsaturated compounds are the acrylyl crosslinkable monomers which contain at least two acryl and/or methacryl groups per molecule or one acryl and/or methacryl group attached to a moiety containing at least 6 carbon atoms or the multivinyl containing compounds that contain at least two vinyl groups per molecule.

This family of crosslinkable monomers are described by materials such as diacrylate and methacrylate esters of a variety of diols such as 1,6 hexane diol, neopentyl glycol, butylene glycol, diethylene glycol, tetra ethylene glycol, tripropylene glycol, polyethylene glycol and the like, ethoxylated Bis Phenol A diacrylate and dimethacrylate; also the reaction product of either acrylic acid or methacrylic acid with the diglycidyl ether of Bis Phenol-A and higher molecular weight versions as illustrated below.

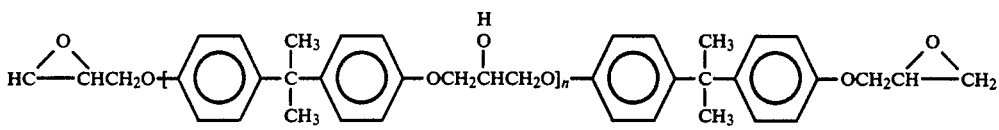

wherein n greater than 0.2.

Many such structures are available commercially as vinyl ester resins.

Greater functionality materials are represented by, but not limited to, trimethylol propane trimethacrylate or acrylate, pentaerythritol teta acrylate or methacrylate, dipentaerythritol penta acrylate or methacrylate, ethoxylated trimenthyol propane triacrylate and the like. Also multifunctional acrylates and methacrylates containing urethane linkages are useful.

Another class of highly reactive olefinically unsaturated compound are the multi-vinyl compounds, that is, compounds that contain at least two reactive vinyl groups in the molecule, particularly at least two vinyl groups in the molecule that are bonded to an arene such as benzene. These are illustrated by such compounds as 1,4-divinyl benzene, divinyl toluene, trivinyl benzene, divinyl napthylene, and the like.

In addition to the di and multifunctional monomers, good results are obtained with mono functional acryl or methacryl linkages, when derivatized with larger hydrocarbon moieties or such materials containing functional groups. These are represented by the following structure.

$R^0$ is alkyl (such as alkyl of 1-4 carbon atoms) or H, and $R^1$ is a hydrocarbon group containing at least 6 carbon atoms or functional moieties such as $(CH_2CH_2)_x$—OH and like, where x can be from 1 to 18.

Optional Ingredients

An optional component of the compositions of the invention is a viscosity reducing agent. In one aspect, the invention employs, generally in combination with thermoplastic vinyl acetate polymer and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{14}$), palmitic ($C_{16}$), palmitoleic ($C_{16}$), stearic ($C_{18}$), oleic ($C_{18}$), linoleic ($C_{18}$), and the like acids, and the acids may be either straight chain or branched chain. Products in which mixtures of acids of the foregoing kind occur, such as tall oil acid, may be used.

The viscosity reducing agent can be present in amounts ranging from 0.4 to about 6 weight percent, and preferably from about 1 to 4 weight percent, based on the combined weight of thermosetting resin, copolymerizable monomer and low profile additive.

When desired a thickening agent can also be employed in the compositions of the invention. Such materials are known in the art, and include the oxides and hydroxides of the metals of Group I, II and III of the Periodic Table. Illustrative examples of the thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, plus monomer, plus low profile additive.

Alternatively, a dual thickening system maybe employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present. Reference is made to the Belgium Patent No. 849,135 for a description of such dual thickening systems. Other illustrations can be found in U.S. Pat. No. 4,535,110 issued Aug. 13, 1985. In addition to combining with polymerics low profile additives these materials are also effective when these low profile polymers are used in the presence of other shrinkage control additives.

The polyester molding compositions may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, t- butyl peroctoate, methyl ethyl ketone peroxide, and others know to the art. The polymerization initiator is employed in a catalytically effective amount, such as from about 0.3 to about 2 to 3 weight percent, based on the weight of the polyester plus monomer plus low profile additive;

2. Fillers such as clay, hydrate alumina silica, calcium carbonate and others known to the art;
3. Reinforcing fillers such as glass fibers or fabrics, carbon fibers and fabrics, aramide fibers and fabrics, asbestos fibers or fabrics, polypropylene, acrylonitrile/vinyl chloride copolymers, PAN fibers and fabrics;
4. Mold release agents or lubricants, such as zinc stearate, calcium stearate, calcium stearate, and others known to the art; and
5. Rubbers or elastomers such as:
   a. homopolymers or copolymers of conjugated dienes have a weight average molecular weight of 30,000 to 400,000 or higher as described in U.S. Pat. No. 4,020,036. The conjugated dienes contain from 4–12 carbon atoms per molecule such as 1,3-butadiene, isoprene, and the like;
   b. epihalohydrin monomer(s), or a copolymer of an epihalohydrin monomer(s) with an oxide monomer(s) having a number average molecular weight (Mn) which varies from about 800 to about 50,000 as described in U.S. Pat. No. 4,101,604;
   c. chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471;
   d. hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/norbornadiene, as described in U.S. Pat. No. 4,161,471;
   e. conjugated diene butyl elastomers, such as copolymers consisting of from 85 to 99.5% by weight of a $C_4$-$C_7$ is olefin having 4 to 14 carbon atoms, copolymers of isobutylene and isoprene where a major portion of the isoprene units combined therein have conjugated diene unsaturation as described in U.S. Pat. No. 4,160,759.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

FIRST EXPERIMENTAL SECTION

Definitions

Component A—A highly reactive unsaturated polyester resin sold by Freeman Chemical Co. for automotive body panel molding applications.

Component B—A copolymer of acrylic acid with vinyl acetate (0.8/99.2 by weight) dissolved to 40% in styrene.

Component C—An epoxidized octyl tallate sold by Union Carbide under the designation Flexol TM EP-8.

Component D—A five percent solution of parabenzoquinnone in diallylphthalate.

Component E—A 33 weight percent solids solution of a poly(vinyl acetate) homopolymer dissolved in styrene monomer.

Component F—A viscosity reducer supplied by Byk Chemie and sold under the designation BYK-W990.

Component G—A calcium carbonate filler supplied by Georgia Marble and sold under the designation Cal-White II TM.

TBPB-T-butylperbenzoate peroxide catalyst.
PDO-50% t-butyl peroctoate peroxide catalyst.

GENERAL PROCEDURES FOR PREPARATION OF SHEET MOLDING

Compound (SMC) Formulations

All the liquid components were weighed individually into a 5 gallon open top container placed on a Toledo balance. The contents of the container were the mixed (in a hood) with a high speed Cowles type dissolver. The agitator was started at a slow speed, then increased to medium speed to completely mix the liquids over a period of 2–3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 32° C. The thickener was next mixed into the paste over a period of 2–3 minutes, the mixer was stopped and 175 grams of the paste was removed from the container and transferred to a wide-mounted 4 oz. bottle. The paste sample was stored in the capped bottle at room temperature and the viscosity measured periodically using a Model HBT 5X Brookfield Synchro-Lectric Viscometer on a Helipath Stand.

The balanced of the paste is next added to the doctor boxes on the sheet molding compound (SMC) machine where it is further combined with fiber glass ($\approx 1''$ fibers). The sheet molding compound is then allowed to mature to molding viscosity and then molded into the desired article.

Method of Schrinkage Measurement

A 18 inch×18 inch×0.125 inch flat panel is molded in a highly polished chrome plated matched metal die mold in a 200 ton press. The exact dimensions of the four sides of this mold are measured to the ten-thousandths of an inch at room temperature. The exact length of the four sides of the flat molded panel is also determined to the ten thousandths of an inch. These measurements are substituted into the equation below:

$(a-b)/a = $ inch/inch shrinkage inch/inch shrinkage×1000=mils/inch shrinkage.
a=the sum of the lengths of the four sides of the mold.
b=the sum of the lengths of the four sides of the molded panel.

A positive (+) number recorded indicates an expansion of the molded part as measured at room temperature compared to the dimension of the mold measured at room temperature. A negative (−) number indicates shrinkage by the same comparison. The larger the positive number, the better the performance.

Surface smoothness and gloss evaluations were done visually with the aid of the light box fitted with straight lines of one inch by one inch squares. The "trueness" of the reflection of these lines from the molded panel was a judgement of surface smoothness. Long term waviness is a judgement of the overall straightness of single lines across the entire panel while short term waviness is a judgement of the sharpness (width).

Molding

Flat panels 18 inches×18 inches of varying thickness were molded using an extremely smooth, highly polished matched metal die set of chrome plated molds. Both platens are oil heated separately to allow for varying temperature. The molding was conducted in a 200 ton press and the panel removed with the aid of ejector pins. A standard molding temperature is 148°-152° C. at pressures of 500 to 1000 psi. Laminate thicknesses are typically 0.10 and 0.125 inches.

Interlaminar Shear Test

Scope

This test is to measure the interlaminar strength of a molded fiberglass specimen by perpendicular tensile forces. The test is restricted to flat or nearly flat sections of the molding.

Equipment used in the test are set forth immediately below.

1. Instron tensile testing machine; 10,000 pound cell. Universal Testing Machine Jaws.
2. Instron oven with temperature control for 300° F.
3. Metal mounts for bonding to specimens with diameters at bonding area of 1.59 inches (2 square inch area). Two (2) mounts required per specimen, each pair numbered. Mounts threaded for attachment to Universal Testing Machine Jaws.
4. Alignment fixture for holding metal mounts and specimen during oven curing of the bond.

Bonding Adhesive used in this test was Hysol Adhesive EA 934, purchased from Hysol Adhesive EA 934, Wolcott Park Inc., 999 East Ridge Rd., Rochester, N.Y. 14621.

Flat plaques were molded from standard type SMC's (resin, filler, fiberglass, in normal amounts). Standard mold temperature of 290/300° F. and molding pressure of 100±200 psi. Plaque thickness to be normal 0.100".

Flat Production Parts

Any 1⅛" square area of a nearly flat part may be tested. Each test should consist of (3) specimens from the same general area.

Procedure

A. Specimen Preparation

1. Cut (3) specimens approximately 1⅛" square from flat area of test specimen, at least 3" away from any visible defects such as blisters, molded in flash, non-fills, etc.; and 1" from external edge of part (if possible).
2. Lightly sand (240 grit) both bonding surfaces of specimen and wipe clean with alcohol.
3. Mix small amount of (2) component bonding adhesive together (ten specimens require approximately 33 grams).
4. Apply 20-40 mil film of adhesive on opposing faces of metal mounts.
5. Hand squeeze the FRP specimen between the two metal mounts to insure good contact.
6. Place the specimen with mounts into the alignment fixture. Observe alignment to be sure sufficient FRP is overhanging all edges of the amount.
7. After all the specimens are in the alignment fixture, place into preheated oven.
8. Cure bonding adhesive for 30 minutes at 200° F.
9. Sand or grand off the excess edges of the FRP square to the diameter of the metal mounts.

B. Testing

1. Preheat Instron over (with all specimens inside) for 2 hours at 300°.
2. Each specimen is tensile pulled in the over at 300° a cross-head speed of 0.05 inches per minute.
3. Record the failure loan (pounds).
4. Determine the interlaminar strength (psi) by dividing the failure load by 2 square inches.
5. Report interlaminar strength as the average of the specimens tested for subject area.

EXAMPLES 1-6

First Experimental Section

The formulations below were prepared in sheet molding compound (SMC) and molded into flat panels at both 12 inches×12 inches and 18 inches×18 inches at 0.125 inches and 0.100 inches thickness. Conditions were 150° C. (top platen) to 146° C. (bottom platen) at 1000 psi pressure and 90 seconds cure time. Results are given in Tables I and II, this below.

TABLE I (First Experimental Section)

| | Control[1] | Examples: | | | | | |
|---|---|---|---|---|---|---|---|
| | | 1 | 2 | 3 | 4 | 5 | 6 |
| Component A | 55 | 55 | 55 | 55 | 55 | 55 | 55 |
| Component B | 33.3 | | | | | | |
| Component C | 2.5 | | | | | | |
| Vinyl Acetate | 1.2 | | | | | | |
| Styrene | 7 | 7 | 7 | 7 | 7 | 7 | 7 |
| 1,3 butylene glycol dimethacrylate | — | 4.0 | — | — | — | — | — |
| Divinylbenzene | — | — | 8.0 | — | — | — | — |
| Trimethyolpropane trimethacrylate | — | — | — | 4.0 | 8.0 | — | — |
| Pentaerthyritoltetracrylate | — | — | — | — | — | 4 | — |
| Ethoxylated Bis Phenol A Dimethacrylate | | | | | | | 6 |
| Component D | 0.4 | 0.4 | 0.4 | 0.4 | 0.4 | 0.4 | 0.4 |
| Water % | 0.18 | 0.16 | 0.18 | 0.17 | 0.12 | 0.17 | 0.17 |
| Component F | 1.7 | 1.7 | 1.7 | 1.7 | 1.7 | 1.7 | 1.7 |
| Zinc Stearate | 4.0 | 4.0 | 4.0 | 4.0 | 4.0 | 4.0 | 4.0 |
| Component G | 185 | 185 | 185 | 185 | 185 | 185 | 185 |
| TBPB | 1.3 | 1.3 | 1.3 | 1.3 | 1.3 | 1.3 | 1.3 |
| PDO | 0.5 | 0.5 | 0.5 | 0.5 | 0.5 | 0.5 | 0.5 |
| B-Side[2] | 12.5 | 12.5 | 12.5 | 12.5 | 12.5 | 12.5 | 12.5 |
| Fiberglass 1* Wt % PPG-521 | 28 | 28 | 28 | 28 | 28 | 28 | 28 |

[1] A copolymer of acrylic acid with vinyl acetate (0.8/99.2) dissolved 40% in styrene.
[2] B-Side - Component E - 40.0%; Styrene - 5.0%; black pigment dispersion - 0.7%; CaO - 11.0%; Component G - 43.3%.

TABLE II (First Experimental Section)

| Example | Multifunctional Monomer | Flexural Strength, MPa | Flexural Modulus, MPa | Interlaminar Shear, psi (149° C.) |
|---|---|---|---|---|
| Control | None | 140.6 | 7440 | 491 |
| 1 | 1,3 Butylene glycol dimethacrylate | 151.5 | 7118 | 678 |
| 2 | Divinylbezene | 115 | 5727 | 787 |
| 3 | Trimetholpropane Trimethacrylate | 144.8 | 7785 | 703 |
| 4 | Trimetholpropane Trimethacrylate | 139.1 | 6866 | 743 |

TABLE II-continued
(First Experimental Section)

| Example | Multifunctional Monomer | Flexural Strength, MPa | Flexural Modulus, MPa | Interlaminar Shear, psi (149° C.) |
|---|---|---|---|---|
| 5 | Pentaerthritol tetra-acrylate | 138.3 | 6762 | 738 |
| 6 | Ethoxylated Bis Phenol-A Dimethacrylate | 177.1 | 9764 | 703 |

From the above formulations, molded panels were produces at 150° C. (top platen) to 146° C. (bottom platen) at 1000 psi and 90 seconds cure into 18 inch×18 inch×0.125 inch flat panels using a 50% charge coverage and a 27% coverage on the mold. The number of blisters observed on two panels molded under these stressed conditions are shown below.

| Example | Multifunction Monomer | Number of Blisters |
|---|---|---|
| Control | None | 5 |
| 2 | Divinyl Benzene | 1 |
| 3 | Trimethyol propane Trimethacrylate | 1 |
| 6 | Ethoxylated Bis Phenol A Dimethacrylate | 0 |

Formulations comparable to the control, except they contained no epoxy or secondary crosslinking monomer, were prepared and molded on a truck fender mold at 50% charge coverage. The control exhibited relatively poor flow properties with obvious flow lines and non-homogeneous appearance. Example 4 had no obvious flow line and a more uniform, homogeneous, smooth surface appearance. Physical properties of the material produced in Example 4 were also superior to the control.

Physical properties on some of the above formulations were run at temperatures below 150° C.

|  |  | 80° C. | | 25° C. | | |
|---|---|---|---|---|---|---|
| Example | Multifunction Monomer | Flexural Strength, psi | Flexural Modulus, psi-X10$^6$ | Flexural Strength, psi | Flexural Modulus, psi-X10$^6$ | % Drop |
| Control | None | 10,386 | 0.754 | 19,848 | 1,333 | 48.4 |
| 4 | Trimethol Propane tri-methacrylate | 14,754 | 0.981 | 20,641 | 1.46 | 29 |
| 6 | Ethoxylated Bis Phenol A dimethacrylate | — | — | 21,986 | 1,413 | — |

EXAMPLE 7

First Experimental Section

SMC formulations containing an isocyanate terminated prepolymer were prepared and molded on a commercial automotive hood mold at 160° C. for 60 seconds using a charge coverage of 50 percent of the mold. In one formulation a level of 5.8 percent based on the weight of unsaturated polyester resin, low profile additive and styrene of trimethylol propane trimethacrylate was introduced while another formulation contained none of this material. All other ingredients were identical including Component B as the low profile additive. The isocyanate terminated prepolymer was based on a 2000 molecular weight polypropylene oxide base diol and 4,4' diphenylmethane diisocyanate (MDI) at 2:1 molar ratio of MDI to polyol used at a level of about 7 percent based on the unsaturated polyester resin, low profile additive and styrene. Magnesium hydroxide at 1.9 percent based on the same ingredients was used as the co-thickening agent. Glass fiber contents were approximately 28 weight percent.

The formulation without the trimethylol propane trimethacrylate produced hoods which contained numerous (5–15) blisters and were not suitable for use. The formulation containing the trimethylol propane trimethacrylate gave no blisters and had excellent surface smoothness. These parts were suitable for commercial use.

SECOND EXPERIMENTAL SECTION
General Procedure for Preparation of Bulk Molding Compound (BMC) Formulations All the liquid components were weighted individually into a Hobart mixing pan placed on a Toledo balance. The pan was attached to a Model C-100 Hobart mixer (in a hood). The agitator was started at slow speed, then increased to medium speed to completely mix the liquids over a period of 3–5 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent, if desired, was mixed into the paste over a period of 2–3 minutes, the mixer was again stopped and≃175 grams of the paste were removed from the pan (using a large spatula) and transferred to a wide-mouthed 4oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the paste with the mixer running on slow speed. The mixer was run for 30 seconds after all the glass was in the paste. This short time gave glass wet out without glass degradation. The pan was then removed from the mixer and separate portions of the BMC mix of appropriate amount were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity is chemically thickened. The weight of the BMC added to the foil varies with the molding application.

Method of Shrinkage Measurement

A 18"×18"×0.125" flat panel is molded in a highly polished chrome plated matched metal die mold in a 200 ton press. The exact dimension of the four sides of this mold are measured to the ten-thousandths of an inch at room temperature. The exact length of the four sides of the flat molded panel is also determined to the ten thousandths of an inch. These measurements are substituted into the equation below:

$(a-b)/a = $ inch/inch shrinkage inch/inch shrinkage 1000 = mils/inch shrinkage.

a = the sum of the lengths of the four sides of the mold.

b = the sum of the lengths of the four sides of the molded panel.

A positive (+) number recorded indicates an expansion of the molded part as measured at room temperature compared to the dimension of the mold measured at room temperature. A negative (−) number indicates shrinkage by the same comparison. The larger the positive number the better the performance.

Surface smoothness and gloss evaluations were done visually with the aid of a light box fitted with straight lines of one inch by one inch squares. The "trueness" of the reflection of these lines from the molded panel was a judgement of surface smoothness. Long term waviness is a judgement of the overall straitness of single lines across the entire panel while short term waviness is a judgement of the sharpness (width) of the line. Gloss is judged by how shiny and bright the panel is. The less "scumming" the better the gloss.

Description of Hood Scoop Mold

A hood scoop mold designed like a miniature automotive hood and containing a number of reinforcing ribs and bosses was used for these evaluations. The mold was approximately 10"×16" containing a number of ribs of varying thickness and depth. Also there is a large triangular area (1.9" base and 0.38" thickness) and three circular bosses (0.4", 0.9" and 1.4" in diameter). The mold was installed in a 200 ton Lawton hydraulic press. The mold contains ejector pins for release and is heated with circulating oil.

Descriptions of Materials

Unsaturated Polyester Resin-A is a resin based on maleic anhydride and propylene glycol containing approximately 35 weight percent of styrene as produced by BASF as Palatal P-18.

Vinyl Acetate Polymer-1 is a copolymer of vinyl acetate and acrylic acid (99.2/0.8) of approximately $M_n$—40,070; $M_w$—128,400 (molecular weight).

Vinyl Acetate Polymer-2 is a copolymer of vinyl acetate and acrylic acid (99.2/0.8) of approximately $M_n$—57,840; $M_w$—216,132 (molecular weight).

Vinyl Acetate Polymer-3 is a homopolymer of vinyl acetate of approximately $M_n$—64,270; $M_w$—250,000 (molecular weight).

Diacryl -10−1 is produced by Akzo Chemie and is a vinyl ester resin, ethoxylated Bisphenol A Dimethacrylate, $M_w$—452.

Ethoxylated BisPhenol A dimethacrylate has the following structure:

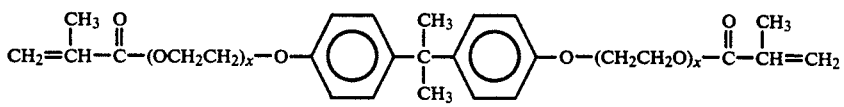

EXAMPLES

Second Experimental Section

Bulk molding compounds were made by procedure previously outlined. The materials were molded into hood scoops at 160° C. for 120 seconds at 1000 psi pressure. A charge weight of 1000 g was used yielding a hood scoop of approximately 0.185" thickness in non-ribbed or bossed sections.

The evaluation procedure was to wipe the molded parts with a black ink stain then rub the stain off. Cracks were easily shown up by this procedure. A crack rating of 0 to 5 was given to each part with 0 indicating no cracks and 5 indicating many cracks. In addition a rating for microporosity was given of 0–5 again with the lowest number the best. Microporosity was judged by the amount of the black ink stain absorbed into the molding. Reduced microporosity should yield fewer defects during painting of the parts. Two different formulations were used. The first formulation is outlined in Table I and the results in Table II. The second formulation is shown in Table III and the results are given in Table IV. These results show the effectiveness of the secondary crosslinking monomers is reducing cracking and, generally, reducing microporosity.

TABLE I

| BMC FORMULATION-1 | |
|---|---|
| | PBW |
| Unsaturated Polyester Resin-A | 53 |
| Low Profile Additive | See Table II |
| Multifunctional Monomer | See Table II |
| Styrene | 5 |
| t-Butyl perbenzoate | 1.5 |
| t-butyl peroctoate 30% | 0.5 |
| 5% parabenzoquinnone in diallyphthalate | 0.4 |
| Zinc stearate | 2.0 |
| Calcium stearate | 2.0 |
| Calcium carbonate (5 micron average particle size) | 230 |
| Glass Fibers ¼" wt. % | 20 |

TABLE II

| | PARTS IN FORMULA OF TABLE I | | | | | | | | | | | |
|---|---|---|---|---|---|---|---|---|---|---|---|---|
| | EXAMPLE | | | | | | | | | | | |
| | 1 | 2 | 3 | 4 | 5 | 6 | 7 | 8 | 9 | 10 | 11 | 12 |
| Vinyl Acetate Polymer-1[a] | 42 | 42 | 39.5 | 39.5 | — | — | — | — | — | — | — | — |
| Vinyl Acetate Polymer-2[b] | — | — | — | — | 42 | 37.8 | 39.5 | 39.5 | 39.5 | — | — | — |
| Vinyl Acetate Polymer-3[c] | — | — | — | — | — | — | — | — | — | 42 | 37.8 | 37.8 |

TABLE II-continued

| | PARTS IN FORMULA OF TABLE I | | | | | | | | | | | |
|---|---|---|---|---|---|---|---|---|---|---|---|---|
| | EXAMPLE | | | | | | | | | | | |
| | 1 | 2 | 3 | 4 | 5 | 6 | 7 | 8 | 9 | 10 | 11 | 12 |
| Trimethylol propane trimethacrylate | — | — | 2.5 | — | — | 4.2 | 2.5 | — | — | — | 4.2 | — |
| Ethoxylated BisPhenol A Dimethacrylate | — | — | — | 2.5 | — | — | — | 2.5 | — | — | — | 4.2 |
| DiAcryl 101 | — | — | — | — | — | — | — | — | 2.5 | — | — | — |
| Crack Rating | 3.5 | 3.0 | 0.0 | 0.0 | 2.0 | 0.0 | 0.0 | 0.0 | 0.5 | 0.9 | 1.0 | 0.0 |
| Micro Porosity Rating | 3.0 | 3.7 | 5.0 | 4.0 | 1.3 | 1.2 | 1.5 | 3.5 | 0.5 | 1.5 | 2.5 | 2.5 |

[a] Used as 40% polymer, 60% styrene solution
[b] Used as 37% polymer, 63% styrene solution
[c] Used as a 35% polymer, 65% styrene solution

TABLE III
BMC FORMULATION-2

| | PBW |
|---|---|
| Unsaturated Polyester Resin | 62 |
| Low Profile Additive | See Table IV |
| Multifunctional Monomer | See Table IV |
| Styrene | 3 |
| Trignox 29B75 | 1.5 |
| 5% Para benzoquinnone in diallylphthalate | 0.4 |
| BYK W990 | 2.0 |
| Zinc Stearate | 4.0 |
| Calcium Carbonate (5 micron average particle size) | 320 |
| Glass fibers (¼") wt. % | 15 |

TABLE IV
RESULTS OF BMC FORMULATION - 2
PARTS IN FORMULA OF TABLE III

| | EXAMPLE | | | | | | | | | |
|---|---|---|---|---|---|---|---|---|---|---|
| | 13 | 14 | 15 | 16 | 17 | 18 | 19 | 20 | 21 | 22 |
| Vinyl Acetate Polymer1[a] | 38 | 38 | 34.2 | 34.2 | 34.2 | 34.2 | — | — | — | — |
| Vinyl Acetate Polymer-2[b] | — | — | — | — | — | — | 38 | 38 | 34.2 | 34.2 |
| Vinyl Acetate Polymer-3[c] | — | — | — | — | — | — | — | — | — | — |
| Trimethylol propane trimethacrylate | — | — | 3.8 | — | 3.8 | — | — | — | 3.8 | — |
| Ethoxylated BisPhenol A dimethacrylate | — | — | — | 3.8 | — | 3.8 | — | — | — | 3.8 |
| Crack Rating | 3.0 | 2.5 | 2.0 | 2.0 | 0.5 | 1.0 | 0.0 | 1.5 | 0.0 | 0.0 |
| Micro Porosity Rating | 3.0 | 4.0 | 2.5 | 2.8 | 1.5 | 0.5 | 3.0 | 1.0 | 2.0 | 1.5 |

[a] Material used at 40% wt. polymer, 60% wt. styrene solution
[b] Material used as a 37 wt. % polymer, 67 wt. % styrene solution
[c] Material used as a 35 wt. % polymer, 65 wt. % styrene solution

EXAMPLE 23

In a formulation identical to that shown in Table -I, 39.5 parts of a 40% solution in styrene of vinyl acetate polymer-1 was used along with 2.5 parts of isobornyl methacrylate. When molded in an identical fashion to these formulations, a molding with a crack rating of 0.0 was achieved.

EXAMPLE 24

A repeat of example 17 except using triallylisocyanurate in place of trimethylolpropane trimethyacrylate yielded a crack rating of 3.3 showing no improvement over vinyl acetate polymer-1 alone.

We claim:

1. A process for producing molded parts, comprising:
forming a polyester-based curable molding composition into a desired shape in a mold under pressure; and
heating said formed composition in the mold, at a temperature in the range of greater than 140° C. to about 200° C.;
said polyester-based curable molding composition being an improved curable molding composition containing a resin system of the type which includes as resin system components:
i) a thermosetting unsaturated polyester resin which is the reaction product of an olefinically unsaturated dicarboxylic acid or anhydride with a polyol;
ii) an ethylenically unsaturated monomer which is copolymerizable with said unsaturated polyester resin to provide crosslinking; and
iii) a thermoplastic low profile additive material for shrinkage control;
wherein the improvement comprises the combination of said resin system components and:
iv) from 1% to 10% by weight, based on the total weight of the resin system, of at least one highly reactive olefinically unsaturated material which is different from said ethylenically unsaturated monomer, and is present in the molding composition in an amount which is less than the amount of said ethylenically unsaturated monomer and which is sufficient to improve the cracking or blistering resistance of the cured molding composition without adversely affecting its surface smoothness, said highly reactive olefinically unsaturated material being selected from the group consisting of:
a) the di- acrylate or methacrylate of a diol selected from the group consisting of hexane diols, neopentyl glycol, butylene glycol, diethylene glycol, tetraethylene glycol, and tripropylene glycol;
b) the tri- acrylate or methacrylate of trimethylol propane;
c) the tetra- acrylate or methacrylate of pentaerythritol;

d) the di- acrylate or methacrylate of an ethoxylated Bis Phenol A;

e) the acrylate or methacrylate of isobornyl alcohol; and f) divinyl benzene;

whereby the surfaces of molded parts so produced are superior, in terms of cracking and blistering, to surfaces of parts produced in an otherwise similar process in which highly reactive olefinically unsaturated material of paragraph iv is not employed.

2. The process of claim 1, wherein said molding composition further comprises a filler selected from the group consisting of (a) reinforcing fiber, (b) inert filler, and (c) a combination of both (a) and (b) dispersed therein, said resin system being in intimate contact with said filler;

said reinforcing fiber (a) being selected from the group consisting of fibers or fabrics of glass; and said inert filler (b) being selected from the group consisting of clay, alumina trihydrate, silica, and calcium carbonate.

3. The process of claim 1 wherein in said molding composition the thermosetting unsaturated polyester resin further includes at least one of the following:

a) carboxylic acid functionalities; and b) esterified moieties of a saturated or aromatic dicarboxylic acid or anhydride.

4. The process of claim 1 wherein said molding composition further comprises at least one of the following:

a) a thickening agent selected from the group consisting of magnesium oxide, calcium oxide, calcium hydroxide, zinc oxide, barium oxide, and magnesium hydroxide; and b) a polyisocyanate resin.

5. The process of claim 1 wherein in said molding composition the ethylenically unsaturated monomer is selected from the group consisting of styrene and styrene derivatives bearing lower alkyl or halo- substituents.

6. The process of claim 1 wherein in said molding composition the thermoplastic low profile additive material is selected from the group consisting of poly(vinyl acetate), polyalkylmethacrylate, and polyurethane polymers.

7. The process of claim 1 wherein said molding composition further comprises at least one of the following:

a) an epoxy monomer essentially free of reactive unsaturation; and b) a secondary crosslinking monomer with an $r_1$ value greater than 1 relative to styrene.

8. A molded article formed using the process and the molding composition of claim 1.

* * * * *